United States Patent [19]
Shiraishi et al.

[11] 4,370,687
[45] Jan. 25, 1983

[54] MAGNETIC DISK APPARATUS

[75] Inventors: Fumitake Shiraishi; Masahiko Fujioka; Masao Fujiki, all of Hamura, Japan

[73] Assignee: Tokyo Shibaura Denki Kabushiki Kaisha, Japan

[21] Appl. No.: 234,799

[22] Filed: Feb. 17, 1981

Related U.S. Application Data

[63] Continuation-in-part of Ser. No. 16,539, Mar. 1, 1979, abandoned.

[30] Foreign Application Priority Data

Mar. 9, 1978 [JP] Japan .................. 53-25995

[51] Int. Cl.³ .................. G11B 5/012; G11B 23/02
[52] U.S. Cl. .................. 360/98; 360/133
[58] Field of Search .................. 369/97–99, 369/86, 133

[56] References Cited

U.S. PATENT DOCUMENTS

| | | | |
|---|---|---|---|
| 2,899,260 | 8/1959 | Farrand et al. | 360/98 |
| 3,534,344 | 10/1970 | Santana | 360/77 |
| 3,786,454 | 1/1974 | Lissner et al. | 360/98 |
| 3,800,325 | 3/1974 | O'Brien | 360/133 X |
| 3,849,800 | 11/1974 | Cuzner et al. | 360/97 |
| 3,936,786 | 2/1976 | Peterson et al. | 337/80 |
| 3,975,768 | 8/1976 | Jacques et al. | 360/99 |
| 4,130,845 | 12/1978 | Kulma | 360/97 |

*Primary Examiner*—John H. Wolff
*Attorney, Agent, or Firm*—Finnegan, Henderson, Farabow, Garrett & Dunner

[57] ABSTRACT

A magnetic disk apparatus utilizing both fixed and removable disk mounted on a common spindle, wherein a first head-positioning device for supporting a first group of magnetic heads cooperating with fixed disk and a second head-positioning device for supporting a second group of magnetic heads cooperating with removable disk means are independently controlled in operation; a drive spindle, fixed disk, first group of magnetic heads and first head positioning device are received in an enclosure, which is removably mounted on a base casting and shot off from dust particles; the removable disk is exposed to the outside of the enclosure; and the second head-positioning device is securely mounted on the base casting.

3 Claims, 5 Drawing Figures

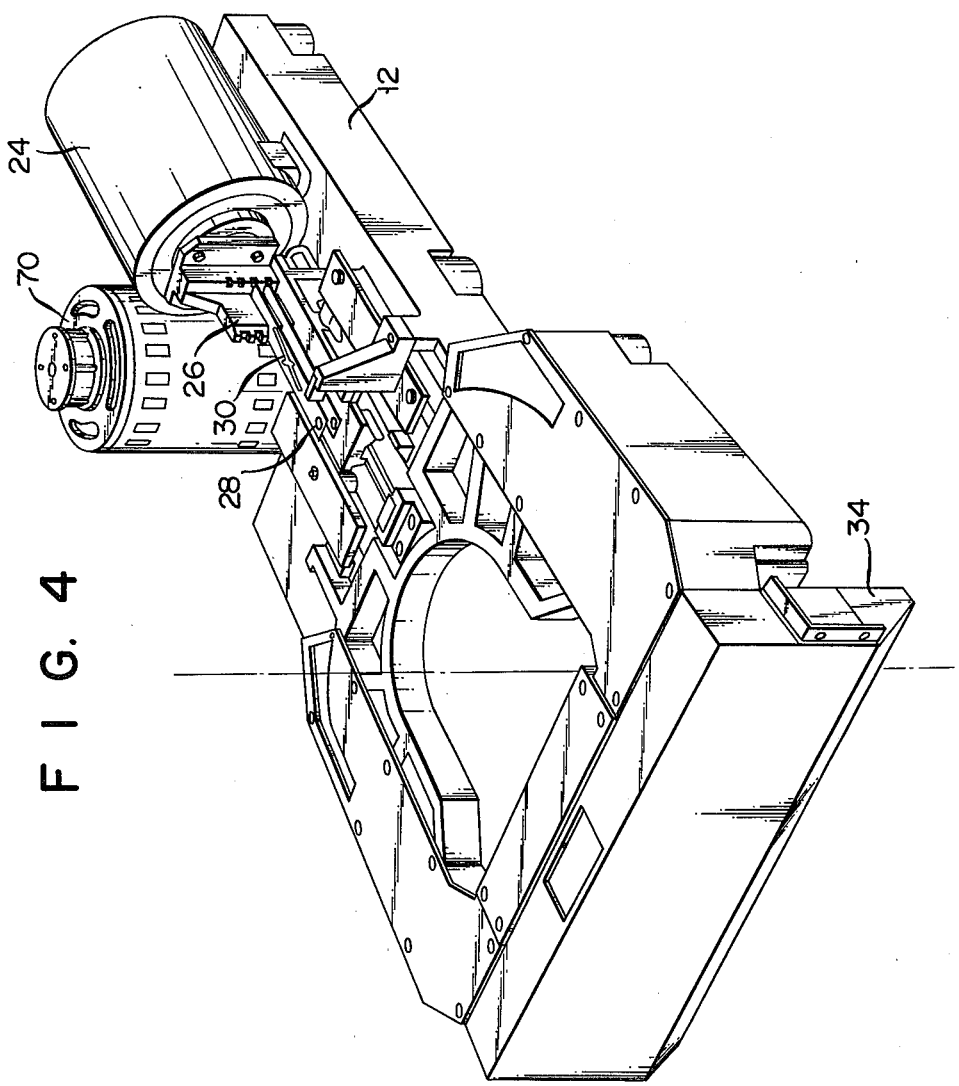

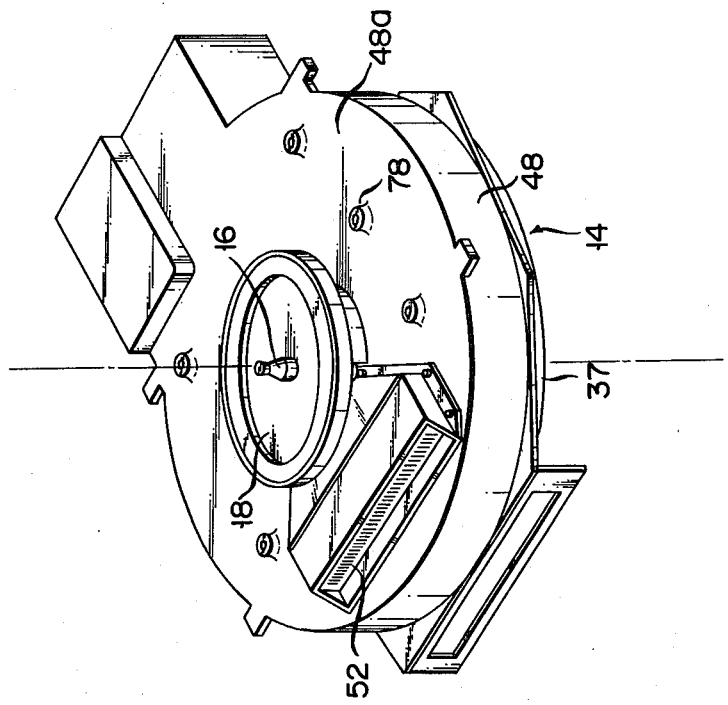

MAGNETIC DISK APPARATUS

This is a continuation in part of Ser. No. 16,539, filed Mar. 1, 1979 now abandoned.

BACKGROUND OF THE INVENTION

This invention relates to a magnetic disk apparatus utilizing removable disk means and fixed disk means.

A magnetic disk apparatus is widely used as a bulk memory in a data-processing system. In a magnetic disk apparatus utilizing both removable and fixed disk means, the fixed disk means is permanently seated on a drive spindle rotatably supported on a base casting. On the other hand, the removable disk means enclosed in a disk cartridge is interchangeably mounted on the upper end portion of the drive spindle. A first group of magnetic heads cooperating with the fixed disk means and a second group of magnetic heads cooperating with the removable disk means are fitted to a common head positioning device. Accordingly, the magnetic heads are shifted from track to track along the surface of the corresponding disk means. The above-mentioned elements are received in a housing provided with a door through which the disk cartridge passes.

One of the greatest problems of the prior art magnetic disk apparatus constructed as described above is that considerable difficulties are encountered in carrying out the maintenance of the fixed disk means and the magnetic heads cooperating therewith. The reason for this is that the fixed disk means is permanently set on the inner bottom space of a housing defying an easy access by a maintenance operator.

Another drawback of the conventional magnetic disk apparatus is that while recording or readout is carried on with respect to a particular track formed in either the fixed or the removable disk means, it is impossible to undertake recording or readout with respect to a different track on the other disk means. The reason for this is that the first group of magnetic heads cooperating with the fixed disk means and the second group of magnetic heads cooperating with the removable disk means are fitted to a common head-positioning device, making it impossible to independently control the positions of the first and second groups of magnetic heads.

Further problem of the known magnetic disk apparatus is that recording or readout can not be effected with respect to the fixed disk means, unless the removable disk means is mounted on the drive spindle. The reason for this is that while the removable disk means is not mounted on the drive spindle, the first group of magnetic heads cooperating with the fixed disk means and the second group of magnetic heads cooperating with the removable disk means have to be held in a retracted position alike.

SUMMARY OF THE INVENTION

It is accordingly an object of this invention to provide a novel and improved magnetic disk apparatus utilizing both fixed and removable disk means which has resolved the aforesaid drawbacks accompanying the prior art magnetic disk apparatus.

Another object of the invention is to provide a magnetic disk apparatus which allows for the easy maintenance of the fixed disk means, magnetic heads associated therewith and head-positioning device.

Still another object of the invention is to provide a magnetic disk apparatus which can independently control the position of the first group of magnetic heads cooperating with the fixed disk means and the position of the second group of magnetic heads cooperating with the removable disk means.

A further object of the invention is to provide a magnetic disk apparatus which can carry out recording or readout with respect to the fixed disk means without the necessity of mounting the removable disk means on the drive spindle.

According to this invention, the first group of magnetic heads cooperating with the fixed disk means is supported on a first head-positioning device, while the second group of magnetic heads cooperating with the removable disk means is supported on a second head-positioning device which can be controlled independently of said first magnetic head-positioning device. The fixed disk means, first group of magnetic heads, the first head-positioning device, drive spindle and sealed enclosure for receiving these elements collectively constitute a sub-assembly referred to as "a sealed disk module". One end of the drive spindle penetrates the first wall of the sealed enclosure to be exposed to the outside. Fixed to the exposed end portion of the drive spindle is a hub for holding the removable disk means in a disk cartridge. The second head-positioning device for supporting the second group of magnetic heads cooperating with the removable disk means is mounted on the base casting, together with the sealed disk module. The sealed disk module is interchangeable for another only for maintenance purpose. Where the maintenance of the used sealed disk module is necessary, then the module is replaced by a fresh one or the one repaired in a repair shop.

According to a preferred embodiment of this invention, the drive spindle is operated by a motor mounted on the base casting.

According to another preferred embodiment of the invention, the drive spindle is fitted with a fan for supplying cooling and cleaning air. Air sent forth from the fan passes through an air duct provided with a filter and fitted to the base casting and is conducted to the interior of the disk cartridge and every section of the magnetic disk apparatus.

According to still another preferred embodiment of the invention, the enclosure of the sealed disk module comprises an intake fitted with an air suction filter and an outlet provided with an exhaust filter. Cooling and cleaning air is carried into the enclosure of the sealed disk module through the air duct and air suction filter, and thereafter drawn off to the outside through the exhaust filter.

BRIEF DESCRIPTION OF THE DRAWINGS

This invention will be further explained by way of example with reference to the accompanying drawings in which:

FIG. 4 is a perspective top view of the base plate of the magnetic disk apparatus; and FIG. 5 is a perspective top view of the sealed disk module of the magnetic disk apparatus.

DETAILED DESCRIPTION OF THE PREFERRED EMBODIMENTS

Figure 1:
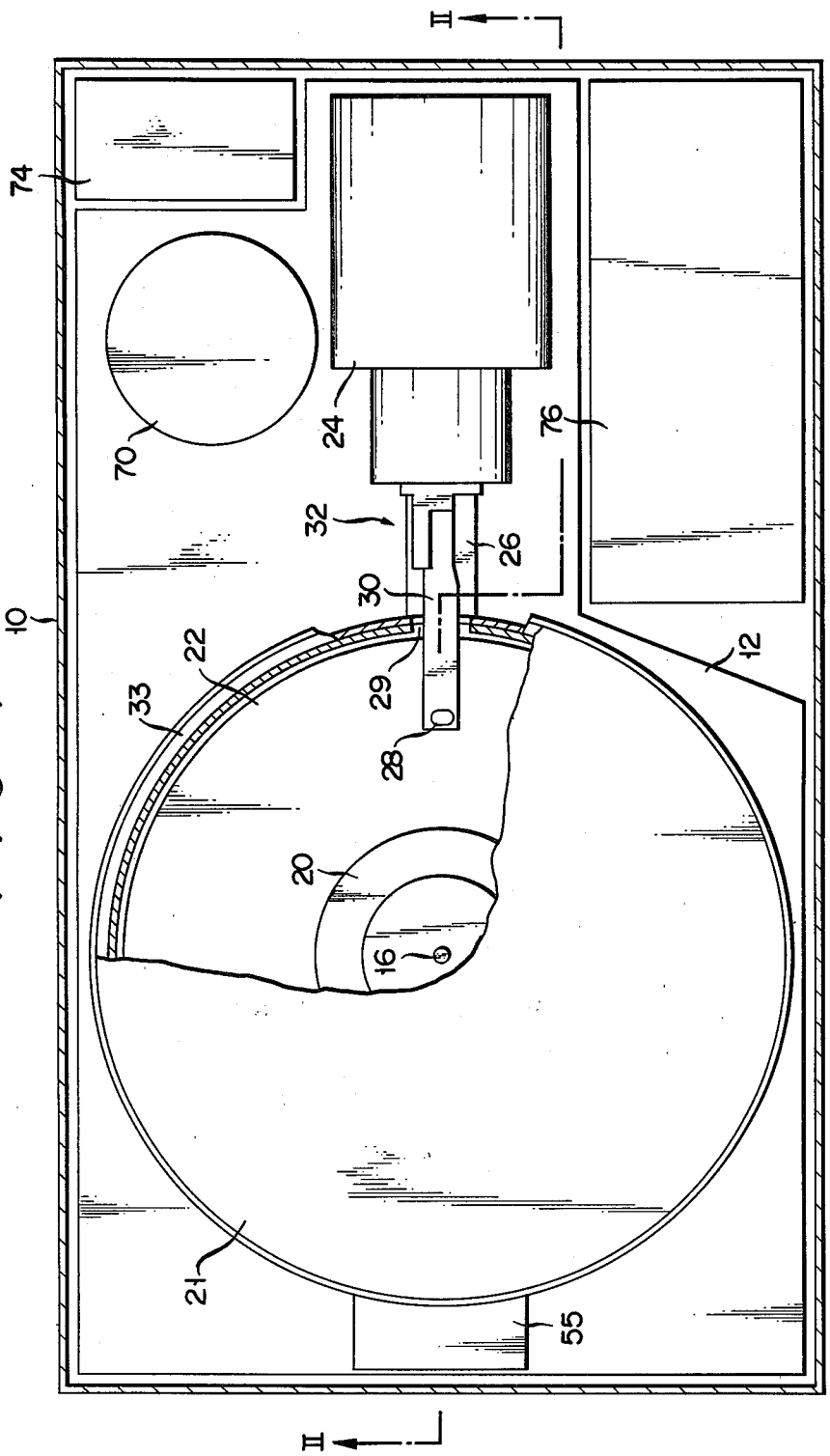
FIG. 1 is an exploded top view of a magnetic disk apparatus embodying this invention.
Figure 2:
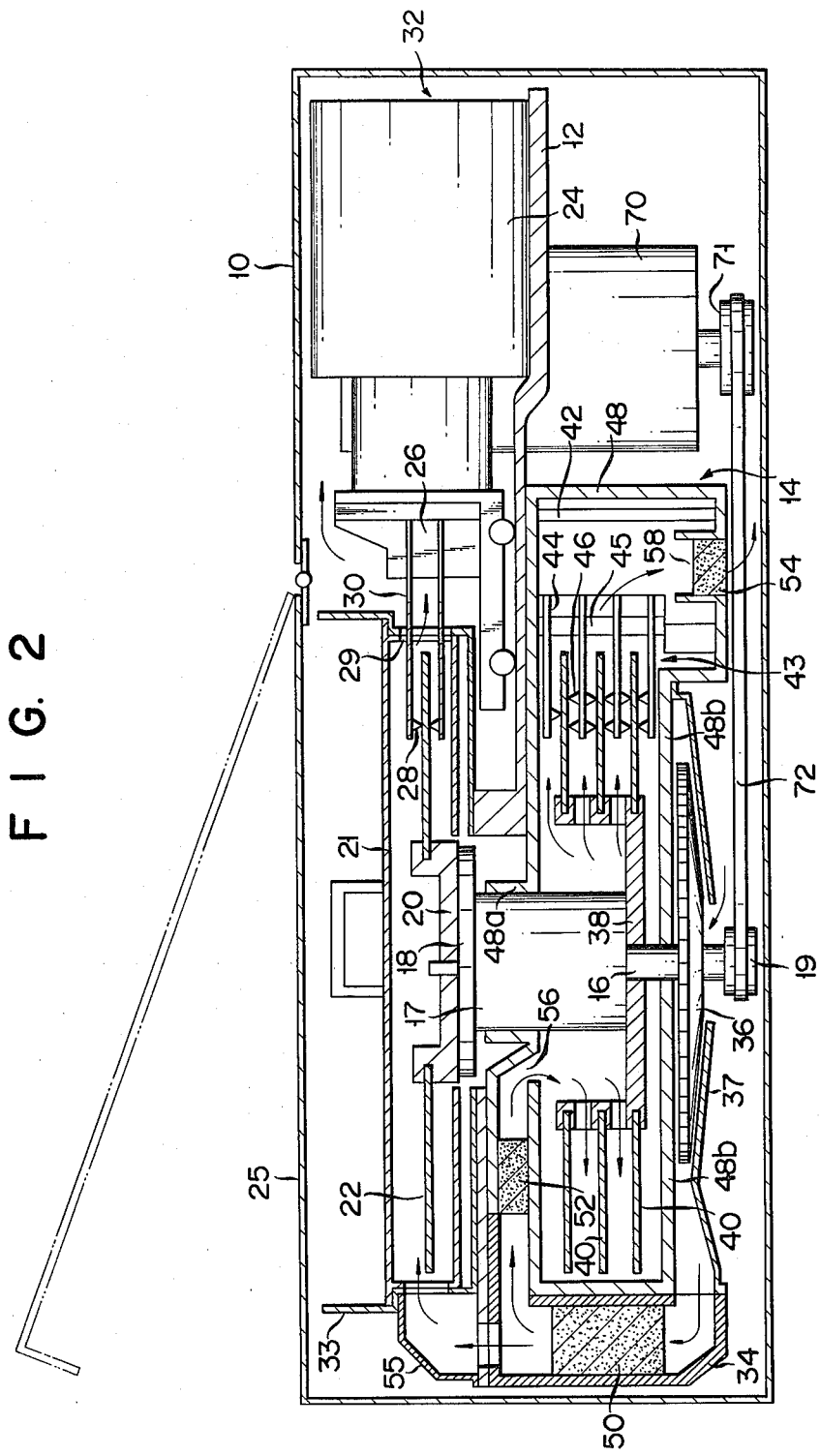
FIG. 2 is a longitudinal sectional view of the magnetic disk apparatus of FIG. 1.
Figure 3:
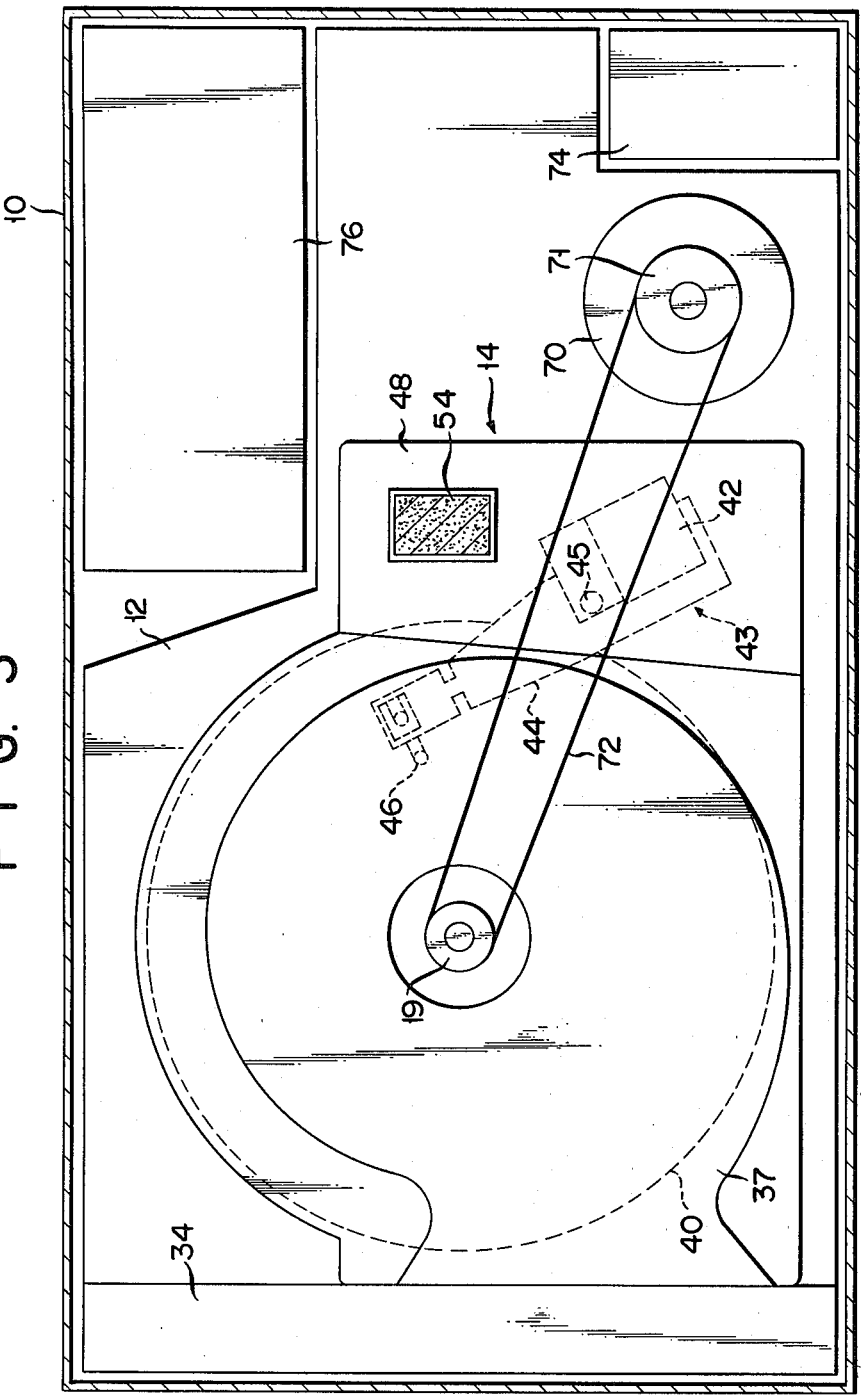
FIG. 3 is a bottom view of the magnetic disk apparatus of FIGS. 1 and 2.

FIGS. 1 to 3 schematically show the arrangement of the main components of a magnetic disk apparatus embodying this invention. This magnetic disk apparatus comprises a base casting 12 horizontally positioned in a housing 10 and a sealed enclosure 48 fitted to the underside of the base casting 12. The upper wall 48a of the enclosure 48 holds a bearing housing 17 for vertically supporting a drive spindle 16. The upper end of the drive spindle 16 penetrates the upper wall 48a of the enclosure 48 and base casting 12 to extend upward. The lower end of the drive spindle 16 penetrates the lower wall 48b of the enclosure 48 to extend downward. A belt 72 is stretched between a pulley 19 fitted to the lower end of the drive spindle 16 and another pulley 71 driven by a drive spindle motor 70 mounted on the base casting 12.

The upper end of the drive spindle 16 supports a flange 18, on which there is interchangeably mounted a removable disk 22, which is rotatably received in a disk cartridge 21 clamped by a hub 20 and has circular tracks formed therein. The housing 10 is provided with a door 25 through which the disk cartridge 21 passes when the removable disk 22 is interchanged for a fresh one. A shroud 33 enclosing the disk cartridge 21 is attached to the base casting 12.

Electromagnetic transducers or magnetic heads 28 cooperating with the removable disk 22 are dispersedly fitted to the forward ends of the head arms 30 extending along the surface of the removable disk 22. A carriage 26 movable on the base casting 12 toward or away from the drive spindle 16 supports arms 30. An actuator 24, for example, a voice coil motor is coupled to the carriage 26 to set the magnetic heads 28 on a desired track formed in the removable disk 22. The actuator 24, carriage 26, and arms 30 jointly constitute a head-positioning device.

Where the removable disk 22 is not mounted on the hub 20 or remains stationary, then the magnetic heads 28 are shifted to a retracted position. Where the removable disk 22 is rotated at an operation speed, then the magnetic heads 28 pass through the head access window 29 formed in the cartridge 21 and the shroud 33 to be shifted to the surface of the removable disk 22, and fly on air bearings formed by boundary layers of air immediately adjacent the removable disk 22.

Received in the enclosure 48 is a head-positioning device 43 consisting of the drive spindle 16, fixed disks 40, magnetic heads 46, rotary arms 44 and actuator 42. The fixed disks 40 have circular tracks formed therein and are permanently clamped by a flange 38 fixed to the drive spindle 16 so as to be rotated with said drive spindle 16.

The magnetic heads 46 cooperating with the fixed disks 40 are dispersedly fitted to the ends of the rotary arms 44 extending along the surface of the fixed disks 40. The rotary arms 44 arranged one atop another are connected together to be jointly rotated about a common pivotal shaft 45. An actuator 42, for example, a voice coil motor is coupled to the rotary arms 44 in order to set the magnetic heads 46 on a prescribed or desired track formed in the corresponding fixed disks 40.

The magnetic heads 46 are always positioned opposite the fixed disks 40 and are so arranged that while unremovable disks 40 remain stationary, the magnetic heads 46 contact the fixed disks 40, and while the fixed disks 40 are rotating at an operation speed, the magnetic heads 46 fly on air bearings formed by boundary layers of air immediately adjacent the unfixed disks 40.

A fan 36 fitted to the drive spindle 16 is disposed between the lower wall 48b of the enclosure 48 and the pulley 19 (FIG. 2). Air streams generated by the fan 36 are conducted by means of a cover 37 (fitted to the lower wall 48b of the enclosure 48) to an air duct 34 fitted to the base casting 12. The air duct 34 contains a main filter 50 for removing dust particles from the introduced air streams. To elevate the reliability of recording and readout operation carried out with respect to the removable disk 22, the filtered air streams are brought as cooling and cleaning air into the disk cartridge 21 through an air duct 55 fitted to the base casting 12. The cooling and cleaning air cleans and cools the interior of the disk cartridge 21 and leaves said cartridge 21 through the head access window 29 to cool the actuator 24.

Dust particles should be prevented from being carried into the enclosure 48 in order to elevate the reliability of recording and readout operation associated with the fixed disks 40. Truly complete sealing of the enclosure 48 is indeed effective to forestall the intrusion of dust particles thereinto, but is likely to result in an excessive increase in the interior temperature of the enclosure 48. Therefore, the enclosure 48 comprises an intake 56 fitted with an air suction filter 52 to introduce cooling air and an outlet 58 fitted with an exhaust filter 54 to draw off air. Cooling and cleaning air conducted into the enclosure 48 through the air duct 34 and air suction filter 52 in turn cleans the surface of the fixed disks 40, cools, for example, the actuator 42, and is expelled out of the enclosure 48 through the exhaust filter 54. In this case, it will be noted that even where the fan 36 happens to stand at rest, the air suction filter 52 and exhaust filter 54 prevent dust particles from entering the enclosure 48.

The spindle 16, bearing housing 17, pulley 19, flanges 18, 38, fixed disks 40, magnetic heads 46, head-positioning device 42, fan 36, cover 37, filters 52, 54 and enclosure 48 constitute a sub-assembly or "sealed disk module", the whole of which can be removed from the base casting 12. The sealed disk module is interchangeable only for maintenance purpose. Where maintenance is necessary for the used sealed disk module, it is advised to replace said module by a fresh sealed disk module or another already repaired in a repair shop.

The maintenance of the sealed disk module should not be attempted on the customer's premises but be carried out on the manufacturer's premises under precisely controlled conditions.

As seen from FIGS. 1 and 3, the housing 10 holds a power supply circuit 72 for supplying power required for the respective sections of the magnetic disk apparatus and a control circuit 76 for independently operating the head-positioning devices 32, 43.

As described above, the control circuit 76 is constructed to independently operate the head-positioning devices 32 and 43. This means that the device 32 is actuated in response to a signal to the control circuit 76 and the device 43 is actuated in response to another signal to circuit 76, and that actuation of the devices 32 and 43 are totally independent of each other. To operate both devices 32 and 43 in this manner, the control circuit 76 is made up of two circuits, i.e., a circuit for controlling the device 32 and a circuit for controlling the device 43. These circuits are of types well-known in the field of magnetic disk apparatus, for example, circuits such as disclosed in U.S. Pat. No. 3,936,786 and U.S. Pat. No. 3,534,344.

FIG. 4 shows the base casting 12 and various elements mounted thereon, such as the actuator 24, carriage 26, arms 30, magnetic heads 28, motor 70 and air duct 34. It will be noted that the shroud 33, air duct 55 and module 14 are taken off.

FIG. 5 is a perspective top view of the module 14, showing the screw holes 78, into which screws are inserted to fit the module 14 including the enclosure 48, spindle 16, flange 18, and air suction filter 52 to the base casting 12.

FIGS. 4 and 5 are given to indicate how the module 14 is fitted to the base casting. The fitting is carried out with the dot-dash lines of FIGS. 4 and 5 aligned with each other.

There will now be described the operation of a magnetic disk apparatus embodying this invention. The module 14 is bolted to the underside of the base casting 12. The removable disk 22 received in the disk cartridge 21 in a state clamped by the hub 20 is mounted on the flange 18 formed at the upper end of the drive spindle 16 protruding above the base casting 12 from the module 14. In this case, the removable disk 22 is enclosed in the shroud 33. When the motor 70 is driven, the spindle 16 is rotated, causing the removable disk 22 and fixed disks 40 to be turned therewith. When the spindle 16 is rotated at an operation speed then the head-positioning device 32 shifts the magnetic heads 28 from the retracted position to the initial position on the surface of the removable disk 22, thereby bringing them into a floating state. The magnetic heads 46 which have landed on the surface of the fixed disks 40 received in the module 48 are also brought into a floating state, and take the initial position by the action of the head positioning device 43. Where an external instruction is given under the above-mentioned condition, the head-positioning devices 32, 43 are put into operation. When the instruction is supplied to the control circuit 76, the magnetic heads 28, 46 are independently shifted to the respective desired positions. Recording and/or readout of information is carried out through the magnetic heads 28, 46 taking said desired positions.

Air sucked by the fan 36 rotating with the spindle 16 is sent forth to the filter 50 received in the air duct 34. Part of the filtered air, that is, cooling and cleaning air passes through the air duct 55, and disk cartridge 21 and along the peripheral surface of the head-positioning device 32 to be expelled to the outside, with the remainder of the filtered air passing through the filter 52, the interior of the enclosure 48 and the filter 54 to expelled to the outside. As a result, the interior of the disk cartridge 21 and enclosure 48 is cleaned and kept at a proper level of temperature.

It will be appreciated that many modifications and variations may be made to the subject magnetic disk apparatus which has been described without departing from the scope of the invention as defined by the appended claims. For example, it is possible to set a plurality of magnetic heads 28 on one side of the removable disk 22 and/or mount a single magnetic head 46 on one side of the respective fixed disks 40. The plural removable disks 22 may be clamped by the hub 20. A single fixed disk may be clamped by the flange 38. Obviously, the numbers of the arms 30 and rotary arms 44 may vary with the above-mentioned modifications. It is possible to use the head-positioning device 32 or 43 having a different form from that which has been described. The spindle 16 may be driven by a motor received in the enclosure 48.

The above-mentioned magnetic disk apparatus embodying this invention offers the advantages that the positions of the magnetic heads 46 cooperating with the fixed disks 40 and those of the magnetic heads 28 cooperating with the removable disk 22 can be independently controlled; recording or readout operation associated with the fixed disks 40 and the similar operation associated with the removable disk 22 can be carried out simultaneously and independently; recording or readout operation associated with the fixed disks 40 can be undertaken without the necessity of mounting the removable disk 22 on the spindle 16; the used sealed disk module 14 for which maintenance is required can be easily replaced by another fresh or already repaired unit; and the maintenance can be carried out on the manufacturer's premises under precisely controlled conditions.

What we claim is:

1. A magnetic disk apparatus comprising a base casting; a sealed enclosure removably secured on one side of the base casting; a drive spindle rotatably supported by the enclosure and having one end exposed on the opposite side of the base casting; means for rotating the drive spindle; fixed disk means received in the enclosure and connected to the drive spindle; first magnetic head means cooperable with said fixed disk means; a flange supported on said one end of the drive spindle; removable disk means interchangeably mounted on said flange; second magnetic head means cooperable with said removable disk means; a first head-positioning device received in the enclosure and operable to shift said first magnetic head means to a desired track formed in the fixed disk means; a second head-positioning device mounted on the base casting for shifting said second magnetic head means to a desired track formed in the removable disk means; and means for controlling the operation of the first and second magnetic head-positioning devices independently of one another.

2. The magnetic disk apparatus according to claim 1, wherein the enclosure comprises an intake fitted with an air suction filter and an outlet provided with an exhaust filter.

3. The magnetic disk apparatus according to claim 2, wherein the drive spindle supports a fan for generating cooling and cleaning air; and the air duct for conducting said cooling and cleaning air to the air suction filter is mounted on the base casting.

* * * * *